Patented June 21, 1938

2,121,412

UNITED STATES PATENT OFFICE 2,121,412

METHOD FOR TREATING ZINC AND PRODUCT FORMED THEREBY

Walter B. Schulte, Madison, Wis., assignor to C. F. Burgess Laboratories, Inc., Chicago, Ill., a corporation of Delaware No Drawing. Application November 28, 1936, Serial No. 113,251

11 Claims. (Cl. 148—6)

This invention relates to a method for treating zinc to form zinc oxide and particularly to form a coating on the surface of the zinc. The objects of this invention are to provide a new and practical method for forming zinc oxide and to form a surface layer on zinc which has new and desirable characteristics.

When zinc, which has been heated to about 300° C., is treated with the vapors of ammonium fluoride and particularly in the presence of air and ammonia, the zinc is attacked. If the treatment is for a short time a surface coating having desirable characteristics is formed. The thickness and other characteristics of the coating are affected by the length of treatment and also by the temperature employed. It may vary from a thin and substantially invisible film to one which is several hundredths of an inch in thickness. The thicker coatings, when pure zinc is used, are creamy white in color, are hard and resemble an enamel, and particularly a vitreous enamel. Such coatings are brittle and may be flaked off in the same way that any hard and brittle coating cracks and flakes when the base is bent. Under the X-ray the coating appears to be pure crystalline zinc oxide if the zinc which is coated is of high purity. Traces of fluorine may be present. Small amounts of impurities in the zinc affect the coating. For example, when iron is present in amounts characteristic of the lower grade spelters a coating is produced which is brownish in color and which does not appear to be nearly as adherent. A small amount of copper has a similar effect. The pure zinc referred to may be electrolytic zinc or the so-called "Horsehead" brand of zinc.

It is possible to treat the surface of either cold or hot galvanized iron. It does not seem feasible to form a heavy coating on galvanized iron since the fumes tend to reach the iron and cause peeling of the galvanizing, and the iron in the zinc causes discoloration of the coating. However, the galvanizing may be given a flash treatment which produces a thin film of the oxide that is useful since it forms an excellent bonding agent for paints such as the ordinary linseed oil paints which do not adhere well to a zinc surface which is not properly prepared. Such a thin film may be formed without appreciably affecting the appearance of the spangles characteristic of the hot galvanizing process.

The zinc is treated in an oven heated to the proper temperature which is usually between 300° and 330° C. Below 280° C. the reaction is very slow. It is usually inadvisable to go above 360° C. because it is undesirable to approach the melting point of zinc (419° C.). The time of treatment is usually from one to three minutes for a thin coating and ten to fifteen minutes for a heavy coating. The time necessary depends upon the temperature used and the thickness desired. It is not necessary to exclude the air and tests seem to indicate that its presence is desirable since it may act as a needed dilution agent or it may actually enter into the reaction. The zinc surface should be free of grease, dirt and oxide in order to obtain the best results. The presence of ammonia with the fluoride also seems to improve the coating. The ammonia may be replaced by ammonium carbonate vapors though it is probable that the ammonia in the carbonate vapors is the active agent. A convenient reagent for producing the desired atmosphere of ammonium fluoride and ammonia is the crystalline compound of the approximate composition $TiF_4.2NH_3.NH_4F$ described in the Svendsen U. S. Patent 2,042,435. A small amount of this compound when introduced into the oven in which the zinc is coated evolves, at the reacting temperature, the mixed ammonium fluoride and ammonia vapors which produce the desired coating. It also is possible to use the complex titanium-tetrafluoride compound, $TiF_4.xNH_3.yNH_4F$, referred to in that patent, this compound being formed when titanium oxide and an excess of ammonium fluoride react at elevated temperatures. This compound, when heated to the zinc treating temperature, likewise evolves a mixture of ammonium fluoride and ammonia which coats the zinc with the adherent oxide.

The process may be used for treating hot galvanized sheets immediately after leaving the hot galvanizing tank and before the sheets have cooled to room temperature. The sheets, after cooling sufficiently to allow the zinc to set, are passed through an oven containing the air and ammonium fluoride vapors with or without added ammonia gas. If the sheets are treated for a short period of time, usually about a minute or two, they may then be removed from the oven and allowed to cool. The resulting sheets remain brightly spangled, but the zinc, nevertheless, has a thin oxide film which forms a bonding agent for paints, inks, etc.

The coating formed by the described treatment may be treated with oil, and, if desired, then heat treated. The oil may be mineral oil or a linseed or other vegetable oil. The oil renders the coating more water resistant and also seems to toughen it to some extent. The coating does not conduct electricity. It is hard and adheres to the zinc base under ordinary conditions as compared to the loose dusty nature of zinc oxide formed by the ordinary reagents. Irregularities or designs in the zinc surface are reproduced in the zinc oxide formed.

Where ammonium fluoride is referred to it includes both the normal and acid fluorides. At the reaction temperatures the ammonium fluoride probably is dissociated to a considerable extent so that the vapors may consist of the constituent hydrofluoric acid and ammonia and such a mixture at the reacting temperature is also included when ammonium fluoride is specified.

The above method also may be used for making a zinc oxide independent of the zinc base. The oxide may be stripped from the surface of the zinc or the treatment may be continued until all of the zinc base is oxidized. For his purpose zinc in ribbon, dust, or granular form is suitable. It is obvious that when the zinc is treated to change it to the oxide in its entirety, higher treating temperatures are desirable to thereby decrease the time required to carry out the reaction.

I claim:

1. The method for treating zinc which comprises heating said zinc in an atmosphere comprising ammonium fluoride vapors and an oxygen-supplying reagent.

2. The method for treating zinc which comprises heating said zinc in an atmosphere comprising ammonia, ammonium fluoride vapors and an oxygen-supplying reagent.

3. The method for treating zinc which comprises heating said zinc at a temperature below the melting point of zinc in an atmosphere comprising air and ammonium fluoride vapors.

4. The method for treating zinc to form an oxide coating thereon which comprises heating said zinc for a limited time at a temperature below the melting point of zinc in an atmosphere comprising air, ammonia and ammonium fluoride vapors.

5. The method for treating a zinc surface to form an oxide coating thereon which comprises exposing said surface while heated to the reacting temperature but below the melting point of zinc and for a limited time to an atmosphere comprising ammonium fluoride vapors and an oxygen-supplying reagent.

6. The method for treating zinc which comprises heating said zinc in an atmosphere comprising ammonium fluoride vapors and an oxygen-supplying reagent at a temperature of about 280° C. to 360° C.

7. The method for treating hot galvanized iron to form a coating on the exposed zinc surface which comprises heating said galvanized iron in an atmosphere comprising ammonium fluoride vapors and an oxygen-supplying reagent at such a temperature and for a length of time sufficient to form a coating thereon which is substantially invisible to the naked eye.

8. The method for surface treating hot galvanized sheets which comprises passing said sheets immediately after leaving the galvanizing furnace and before cooling into an atmosphere of ammonium fluoride vapors and an oxygen-supplying reagent, allowing said sheets to remain in said ammonium fluoride vapors for a time sufficient to form a coating which is a bonding agent for paint applied thereto.

9. The method for treating zinc which comprises heating said zinc in an atmosphere comprising an oxygen-supplying reagent and vapors evolved when a titanium tetrafluoride compound of the general formula $TiF_4.xNH_3.yNH_4F$ is heated.

10. A crystalline zinc oxide formed by heating zinc in an atmosphere comprising ammonium fluoride vapors and an oxygen-supplying reagent.

11. Zinc having an adherent coating of hard zinc oxide formed in situ by heating said zinc in an atmosphere comprising ammonium fluoride vapors and an oxygen-supplying reagent.

WALTER B. SCHULTE.